United States Patent [19]

Nilsson

[11] Patent Number: 6,012,566
[45] Date of Patent: Jan. 11, 2000

[54] MEANS AND METHOD FOR CONVEYANCE OF INDIVIDUAL OBJECTS

[75] Inventor: Rune Nilsson, Anderstorp, Sweden

[73] Assignee: Itab Insustri AB, Jonkoping, Sweden

[21] Appl. No.: 08/735,156

[22] Filed: Oct. 22, 1996

Related U.S. Application Data

[63] Continuation of application No. PCT/SE95/00467, Apr. 25, 1995.

[30] Foreign Application Priority Data

Apr. 26, 1994 [SE] Sweden .................................. 9401434

[51] Int. Cl.[7] ..................................................... B65G 47/26
[52] U.S. Cl. ............................. 198/456; 901/7; 198/474.1
[58] Field of Search ............................... 198/456, 370.01, 198/370.03, 374.04, 370.05, 358, 369.2, 369.5, 802, 345.1, 474.1; 901/7

[56] References Cited

U.S. PATENT DOCUMENTS

| | | | |
|---|---|---|---|
| 4,004,681 | 1/1977 | Clewett et al. | 198/370.03 |
| 4,413,721 | 11/1983 | Bollier | 198/370.03 |
| 4,793,462 | 12/1988 | MCFall | 198/370.03 |

*Primary Examiner*—James R. Bidwell
*Attorney, Agent, or Firm*—Pillsbury Madison & Sutro, LLP

[57] ABSTRACT

A transportation method of individual objects and a means for sorting each object into a receiver is disclosed. In accordance with the method, each object is individually picked from a conveyor and delivered to a selected collecting cassette, the objects being centered on the conveyor before being transferred to a pick-up device. The individual objects are delivered to the cassette with the pick-up device which turns 90 degrees and which tilts toward the selected cassette to deliver the object.

The apparatus for handling of the individual objects includes a conveyor, a pick-up device mounted to a conveyor belt intended to pick-up and move the individual objects, and a device for centering each object before transference to the pick-up device. The pick-up device is turnable by 90 degrees in each direction, and is tiltable in the direction of the object.

6 Claims, 3 Drawing Sheets

MEANS AND METHOD FOR CONVEYANCE OF INDIVIDUAL OBJECTS

This is a continuation of International Appln. No. PCT/SE95/00467 filed Apr. 25, 1995.

FIELD OF THE INVENTION

The present invention is for a means and method for conveyance of individual objects. The invention further aims at sorting individual objects into common groups which objects may be e.g. books which have been returned to a library.

BACKGROUND OF THE INVENTION

Preferably the present invention is used together with a system which identifies the objects and thereupon controls the continued handling of them. Such a system may comprise that each individual object has been marked with a bar code which is read by means of an optical reader. The system generates signals which control the continued handling of the object.

The handling of certain types of objects, such as e.g. books, also brings with it special problems in order to avoid damages to the objects and by the unloading into collection cassettes since objects of very different shapes and sizes shall be handled.

SUMMARY OF THE INVENTION

One object of the present invention is to simplify this kind of handling and sorting of objects. Another object is to bring about a more simple and safe handling than by previously known means and devices for similar purposes.

In a first step the objects are identified by reading a bar code or in another suitable way. Thereupon each single object is transferred to a conveyor, by means of which the object is moved to and transferred to a suitable collecting device, e.g. a book cassette. In connection with the identification of the object there is also an updating of, for example a lending index and a signal is sent to an automatic control system so that the object is put into the correct cassette.

The invention will below be described more in detail with reference to the examples of embodiments of the invention shown in the enclosed Figures.

BRIEF DESCRIPTION OF THE INVENTION

DETAILED DESCRIPTION OF THE INVENTION

Figure 1:
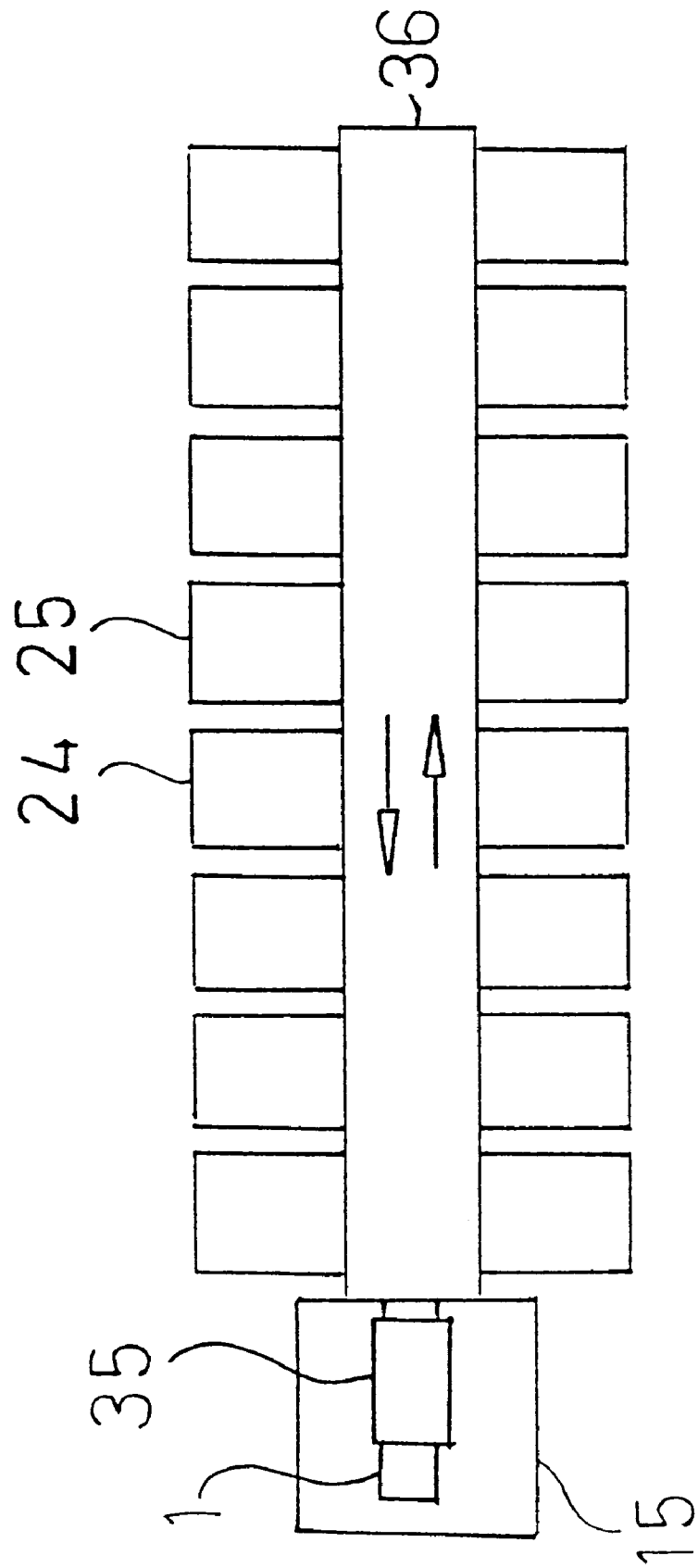
FIG. 1 shows in principle a device according to the invention.

FIG. 1 shows in principle an automatic handling equipment according to the invention which is intended to be used at a library to receive books which are returned and automatically sort them e.g. according to the classification of the book. Hereby each book which is returned shall on its outside have a marking with a bar code which according to the invention is used both to register that the book has been returned and to sort the book to the correct receiving cassette. The device comprises a returning table 15, having a scanner 35. In connection thereto there is a stand 3 with a conveyer which moves in the direction shown by arrows. Along the stand there are sixteen cassettes 24, 25 etc., into which returned books are sorted.

The function of the device is as follows. A conveyer 1 is built into the table 15, onto which returned books are placed. The conveyor belt is divided into sections by cross bars, and in each section one book is placed with the bar code facing upwards. The conveyer brings the returned book through the scanner 35, whereby the book is identified. A signal is then generated which is used by a control system of the device for the sorting of the returned book and a also signal which is used by the system to register the book as being returned and checking that the time for the loan has not been unduly extended. When passing through the identification device 35 each book is also centered on the conveyer e.g. by means of a pair of skewed or bent spring steel blades which press onto the sides of the book. In connection herewith a magnetic alarm strip in the back of the book may also be magnetized. The arrangement of the collection cassettes 24, 25 in connection to the conveyer is more closely shown in FIG. 4. Each cassette 24, 25 etc. is carried by a stand which seen from below slopes outwards from the conveyer. The cassette is movably arranged so that it can be raised at and lowered on the stand and its outer sides have been broken through so that the height of the pile of books in each cassette can be detected by means of a photoelectric cell or a similar device which is not shown in the Figure. When a cassette is empty it returns to its starting position which means that the lower level of the cassette is just below the level of a book which is returned so that this may slide into the cassette. The changed level of the pile of books in the cassette is automatically detected by the abovementioned photoelectric cell and the cassette is automatically lowered so that it is in the correct position to receive the next book. In this way the cassette is filled up and when it has been loaded full with books, it is automatically raised up to its upper position, by which the center of the cassette is slightly above the upper position of the stand. In this position the cassette may be tilted downwards - outwards from the conveyor, whereupon the cassette can be pulled in a direction from the conveyer and transferred e.g. to a carriage with a roller conveyor. On this carriage the cassette and the books are then brought to their position in the library.

Figure 2:
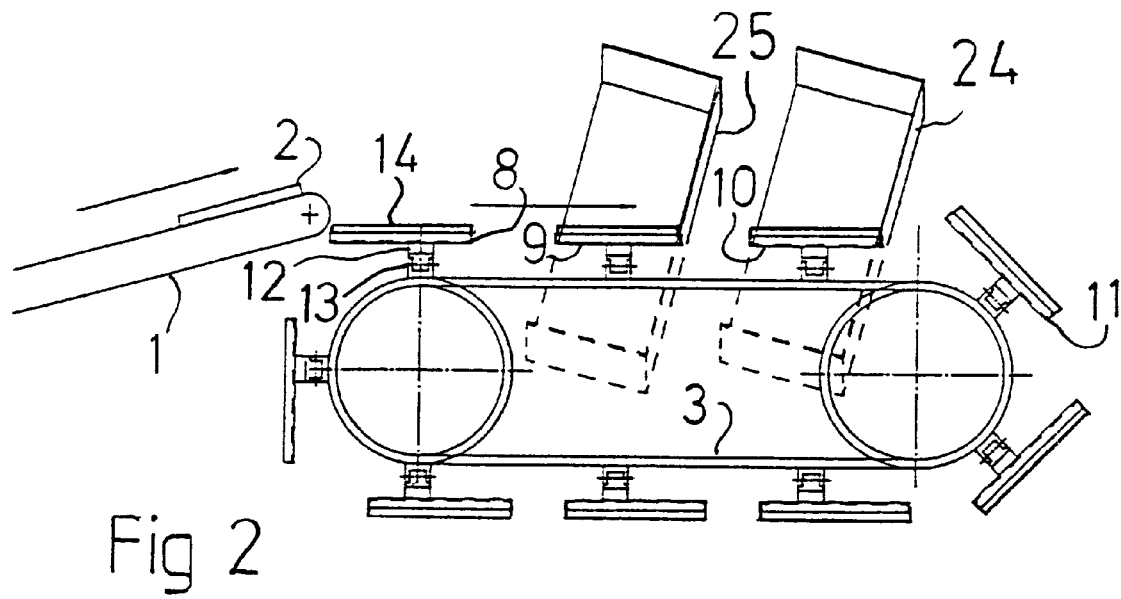
FIG. 2 shows a device according to the invention as seen from the side.
Figure 3:
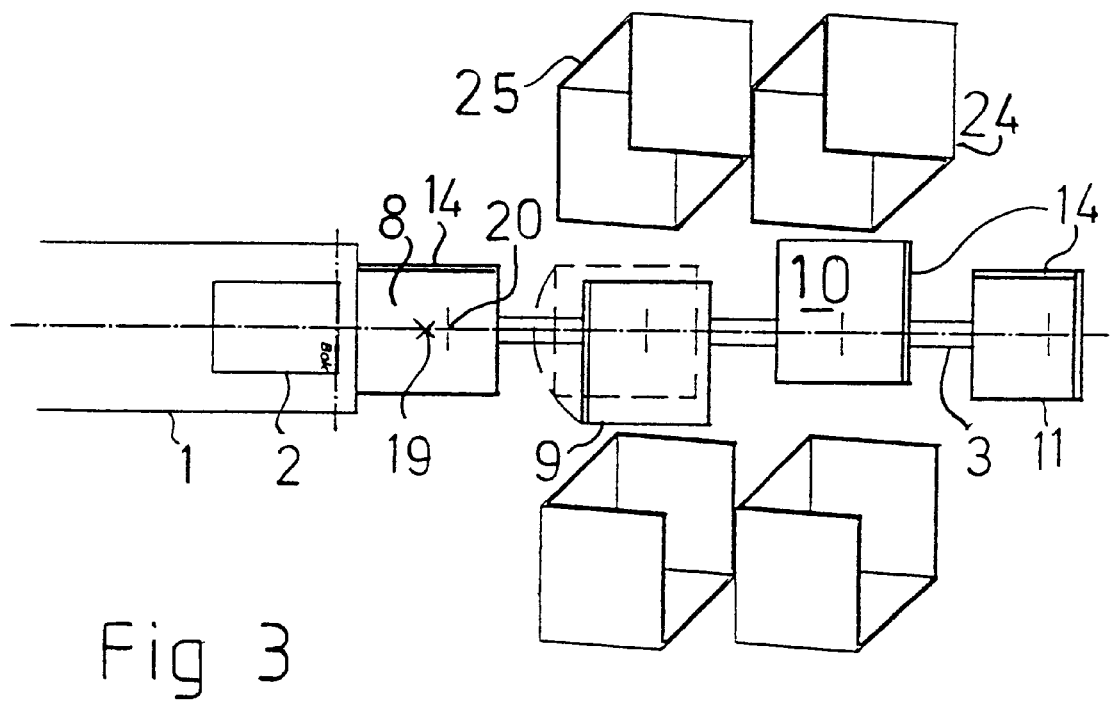
FIG. 3 shows the device of FIG. 1 seen from above.
Figure 4:
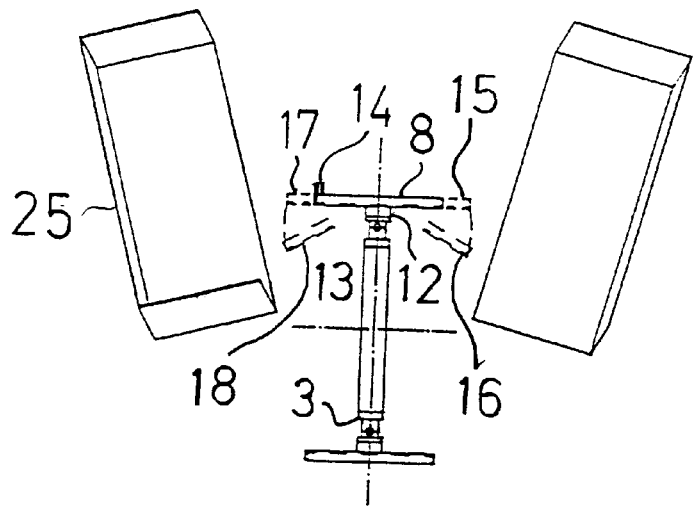
FIG. 4 shows the device of FIG. 1 partly in partial cross section as seen from one of its short ends.

The device shown in FIGS. 2, 3 and 4 comprises a conveyor with a conveyor band 3, onto which there are several plates 8, 9, 10, 11. The plates are mounted onto the conveyor belt 3 by means of a holder 12. The holder is such that the plates may be both turned and tilted. These functions are obtained e.g. by elctro-mechanical and electromagnetic means which do not form a part of the invention and are not shown in the Figures. In connection with the device there is a conveyor 1 for transportation of objects 2 which shall be sorted. The objects are sorted by being discharged to one of several collecting cassettes 24, 25 etc. which are arranged along the sides of the device. Books which have been returned are one at a time placed onto a conveyor belt 1. Hereby each book should be placed in a specified way so that each book has its back at the same direction and a bar code label or the like which is applied on the outside of the book is turned upwards. On the conveyor belt the book 2 is then brought through a device for reading of the code, whereupon the book is transferred to a plate 8 on the conveyor 3. The plate has the shape of flat disc having a protruding edge 14 along one of its sides. After the book has been placed on the plate this is tilted to the side so that the book slides down onto the edge 14. The movement takes place in a link 13 in the mounting 12. Thereupon the plate is returned to a horizontal position. At the same time or immediately in connection herewith the plate is moved and when it has reached a position at the cassette into which the book shall be returned the conveyor is stopped. The plate is turned 90 onto one side depending upon to which side the book shall be delivered. Preferably, the device is so designed that the turning movement takes place in the holder 12 above the link 13. The movement can be obtained e.g. by means of vertically movable rods, the position of which are controlled by the initially read bar code. Hereupon the book is delivered to the cassette by tilting of the plate in the direction towards the cassette. The tilting movement is also obtained in the link 13 of the mounting 12. Thereupon the conveyor 3 moves on and the plate returns to its starting position immediately or later before it returns to the point where another book shall be placed onto this plate.

In one embodiment of the invention the plate is mounted onto the mounting 12 so that the latter is the center of the plate in the direction of its movement when the plate is in a position for receiving of an object. The mounting is displaced along this line from the middle of the plate so that the center of its turning does not coincide with the center of the plate. When the plates are turned 90 to one side they will get into one of the positions which are shown by the plates 9 and 10 in FIG. 3. Herewith is achieved that the edge 14 of the respective plate is in or close to the extension of the side of each cassette 24, 25 etc. As seen from FIGS. 3 and 4, the cassettes of the two sides of the conveyor are differently turned. By the non-symmetric mounting of the plates, it is achieved that they after turning extend closer to the cassettes. This makes a correct delivery of the books easier and reduces the risks that books of different sizes shall meet edge to edge instead of being placed onto each other. By the delivery the respective plate is tilted downwards towards the receiving cassette and the book on the plate slips off therefrom supported along the edge 14. The different positions of the plate are also seen from FIG. 4, where a plate 8 having its supporting edge 14 in receiving position has been drawn by the full line. The displacement 15, 17 of the outer edges of the plates which takes place due to the turning and the displacement 16, 18 which after that takes place when the plates are tilted have been marked by broken lines. The cassettes 24, 25 are displaced in vertical direction, and their position in this direction is controlled by the height of the pile of books in each cassette. Photoelectric cells or other known technology is used for this purpose.

Figure 5:
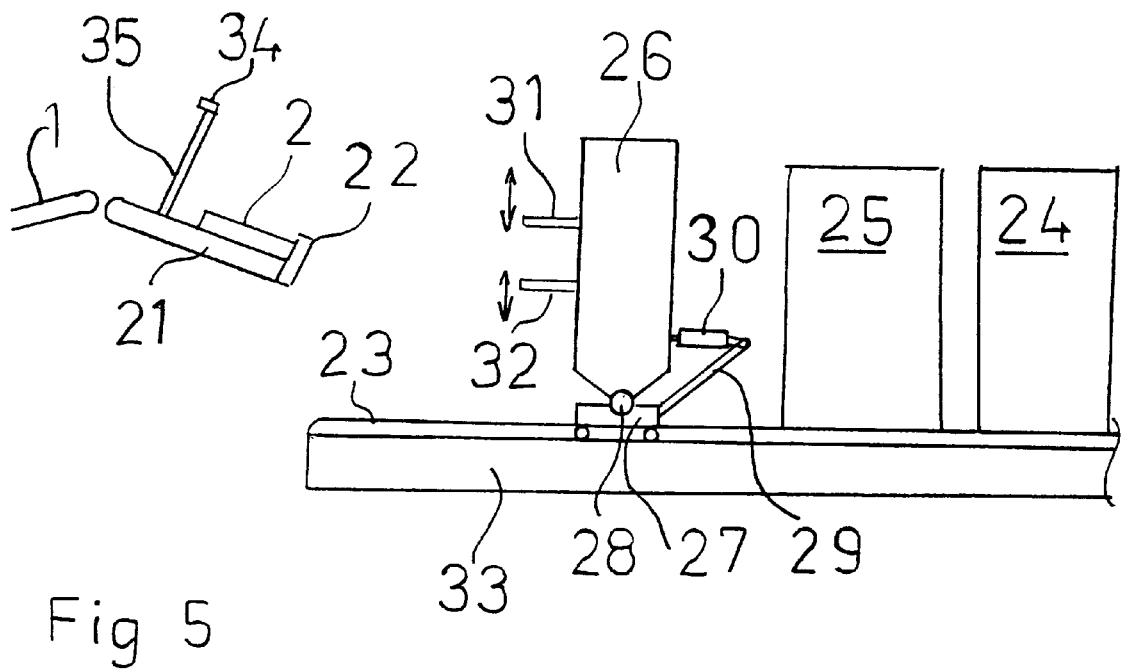
FIG. 5 shows a side view of a preferred embodiment of the invention with a specially designed gripping device and conveying device.

A preferred embodiment of the invention is shown in FIG. 5. In connection with the incoming conveyor 1 there is a roller conveyor 21 which slopes slightly downwards in a direction towards the pick-up lane and the collection cassettes. The roller conveyor ends by a stop being an edge 22. The book 2 waiting to be picked up for sorting onto a cassette rests onto the edge 22 and is centered by means of two rails, one on each side of the book in its lenghtwise direction. The rails are movable in a direction at right angle to the length of the book and the rails. The movement is suitably obtained by means of pneumatic cylinders. The pick up device comprises a lane 33 having a to-and-from movable conveyor belt 23. A pick up robot having a stand 26 and a bottom plate 27 follows with the movement of the band. The stand is movably arranged on the bottom plate and may bend forwards (to the left in the Figure) by moving in the link 28 which comprises an all-through extending shaft and may also be turned at least 90° to the right or to the left relative to the bottom plate. The forward movement is obtained by means of a pneumatic cylinder 30 which is mounted onto the arm 29, which is firmly connected to the stand, and flexibly mounted onto the stand. The turning movement is obtained by means of corresponding devices which are not shown in the FIGURE.

When a book 2 shall be picked up, the robot moves to a position where its gripping devices 31 and 32 extend over the book. The length of the book is indicated by means of a sensor 34 which is mounted onto a stand having the shape of a bow 35 over the roller conveyor 21. The gripping position for the gripping device varies relative to the length of the book so that if the book is short it is gripped by the outer end of the gripping devices but if the book is long the gripping devices extend further in over the book. The purpose of this is that when the book is positioned in a collecting cassette 24, 25 it shall be properly positioned relative to the back wall of the cassette. When the book has been gripped by the robot, this is moved to a position in at the selected cassette, whereupon the robot turns 90° to the right or the left and bends forwards so that the book enters the cassette and is released. The centering of the book which took place before it was picked up by the gripping device now brings with it that each book is positioned centered in the cassette. This can be essential to obtain a steady pile of books of different sizes.

I claim:

1. A device for handling of individual objects and sorting of each individual object into receivers intended therefor, comprising:

a first conveyor;

a second conveyor;

at least one pick-up device mounted onto the second conveyor for picking-up and moving an individual object, wherein the pick-up device may be turned 90° to each direction, and also independent of its turning position may be tilted forwards in the direction of the object; and a device for centering of each object before it is transferred to the pick-up device;

wherein the pick-up device is a robot having a gripping device for holding the object, whereby a gripping position of the pick-up device is varied relative to the length of the book, wherein each object placed onto the first conveyor belt is transported through or along a device for identification of the object, and wherein the object thereafter is automatically transferred to the second conveyor and by the second conveyor is brought along a lane having several receiving stations, whereby a signal which has been generated by the identification of the object controls a delivery of the object from the second conveyor to the receiving station and that by the identification there is also generated at least one signal which controls an activity which is independent of the transportation of the object.

2. A device for handling of individual objects and sorting of each individual object into receivers intended therefor, comprising:

a conveyor;

at least one pick-up device mounted onto the conveyor for picking-up and moving an individual object, which pick-up device may be turned 90° to each direction, and independent of its turning position may be tilted forwards in the direction of the object; and a device for centering each object before it is transferred to the pick-up device.

3. A device for handling of individual objects and sorting of each individual object into receivers intended therefor, comprising:

a conveyor:

at least one pick-up device mounted on the conveyor for picking-up and moving an individual object from the conveyor, wherein the pick-up device may be turned 90° to each direction, and independent of its turning position may be tilted forwards in the direction of the object; and a device for centering of each object before it is transferred to the pick-up device, wherein the pick-up device is a robot having a gripping device for holding of the object, whereby a gripping position of the pick-up device is varied relative to the length of the book.

4. A device for handling of individual objects and sorting of each individual object into receivers intended therefor, comprising:

a first conveyor;

a second conveyor;

at least one pick-up device mounted onto the second conveyor for picking-up and moving an individual object, wherein the pick-up device may be turned 90° to each direction, and independent of its turning position may be tilted forwards in the direction of the object; and a device for centering each object before it is transferred to the pickup device;

wherein each object placed onto the first conveyor is transported through or along a device for identification of the object, the object thereafter automatically being transferred to a second conveyor and by this second conveyor is brought along a lane having several receiving stations, whereby a signal which has been generated by the identification of the object controls a delivery of the object from the conveyor to the receiving station and that by the identification there is also generated at least one signal which controls an activity which is independent of the transportation of the object.

5. A method for transporting and sorting individual objects, comprising:

placing the objects one at a time on a conveyor belt;

centering each of the such placed objects;

picking-up each of the centered objects from the conveyor belt with a pick-up device, the pick-up device being turnable by 90° in both a clockwise and counterclockwise direction; and delivering the objects to a selected cassette by tilting the pick-up device in towards the selected cassette.

6. A. A method according to claim 5, wherein in the step of picking-up, the pick-up device includes a clamping member for gripping the individual objects, wherein a gripping position of the pick-up device is varied relative to the length of the book.

* * * * *